(12) United States Patent
Ullrich et al.

(10) Patent No.: US 7,597,155 B2
(45) Date of Patent: Oct. 6, 2009

(54) TOOL FITTING, ADAPTER AND SYSTEM WITH A TOOL FITTING AND AN ADAPTER

(75) Inventors: Andre Ullrich, Filerstadt-Bernhausen (DE); Thomas Bernhardt, Aichtal-Groetzingen (DE); Kurt Sieber, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 10/579,667

(22) PCT Filed: Jul. 1, 2005

(86) PCT No.: PCT/EP2005/053133

§ 371 (c)(1),
(2), (4) Date: May 18, 2006

(87) PCT Pub. No.: WO2005/024568

PCT Pub. Date: Mar. 9, 2006

(65) Prior Publication Data

US 2007/0145694 A1    Jun. 28, 2007

(30) Foreign Application Priority Data

Sep. 3, 2004  (DE)  .................... 10 2004 042 735

(51) Int. Cl.
*B23B 31/08*  (2006.01)
(52) U.S. Cl. .................... 173/29; 173/132; 173/201; 279/19.1; 279/75

(58) Field of Classification Search ............... 279/19.4, 279/19.1, 74, 75, 905; 173/132, 201, 109, 173/29, 48, 128
See application file for complete search history.

(56) References Cited

U.S. PATENT DOCUMENTS

| 4,174,113 | A  | * | 11/1979 | Eckman ..................... 279/19.4 |
| 4,491,444 | A  |   | 1/1985  | Rumpp et al. |
| 5,741,263 | A  | * | 4/1998  | Umber et al. ................. 606/80 |
| 6,179,300 | B1 | * | 1/2001  | Baumann et al. ........... 279/19.4 |
| 6,536,780 | B2 | * | 3/2003  | Baumann et al. ........... 279/19.4 |
| 6,543,789 | B2 | * | 4/2003  | Frenzel et al. ................ 279/74 |
| 6,659,473 | B2 | * | 12/2003 | Below et al. ................ 279/19.4 |
| 7,073,992 | B2 | * | 7/2006  | Korb et al. .................. 408/204 |

FOREIGN PATENT DOCUMENTS

| DE | 196 21 610 | 12/1997 |
| GB | 2 313 566  | 12/1997 |
| WO | 03/035321  | 5/2003  |

* cited by examiner

*Primary Examiner*—Scott A. Smith
(74) *Attorney, Agent, or Firm*—Michael J. Striker

(57) ABSTRACT

A tool fitting that is provided to accommodate a rotary hammer bit and/or a chisel bit (10) and an adapter (12).

The tool fitting has centering elements (14, 16) for at least reducing the mobility of the adapter (12) when mounted in comparison to the mobility of the rotary hammer bit and/or chisel bit (10) when mounted.

18 Claims, 2 Drawing Sheets

TOOL FITTING, ADAPTER AND SYSTEM WITH A TOOL FITTING AND AN ADAPTER

CROSS-REFERENCE

The invention described and claimed hereinbelow is also described in PCT/EP 2005/053133, filed on Jul. 1, 2005, and DE 102004042735.6, filed on Sep. 3, 2004. This German Patent Application, whose subject matter is incorporated here by reference, provides the basis for a claim of priority of invention under 35 U.S.C. 119 (a)-(d).

BACKGROUND OF THE INVENTION

The invention is based in particular on a tool fitting.

There are known tool fittings that are provided to accommodate a rotary hammer bit and/or a chisel bit as well as an adapter. Toward a first end, the adapter has a fastening region that corresponds to the rotary hammer bit and/or chisel bit and is embodied to be inserted into the tool fitting and toward a second end, has a fitting region comprised of an external thread for a chuck.

SUMMARY OF THE INVENTION

The present invention is based in particular on a tool fitting that is provided to accommodate a rotary hammer bit and/or a chisel bit as well as an adapter.

According to the present invention, the tool fitting has a means for at least reducing the mobility of the adapter when mounted in comparison to the mobility of the rotary hammer bit and/or chisel bit when mounted. This means especially provided for the adapter makes it possible to work with the adapter in a particularly comfortable, precise way. It should be noted that the embodiment of the tool fitting essentially predetermines an advantageous mobility of the rotary hammer bit and/or chisel bit.

If the means is comprised of a centering means that is provided to center the adapter and has at least one centering surface separate from a bearing surface for supporting the rotary hammer bit and/or chisel bit, then it is possible to achieve a particularly advantageous true running of the adapter that is at least largely independent of a wear during a rotary hammer bit and/or chisel bit operation.

The means comprised of a centering means can have various centering surfaces deemed appropriate by those skilled in the art, for example cylindrical and/or stepped centering surfaces, etc. But if the means has at least one centering surface embodied in the form of an inclined surface, in particular a conical surface, then it is possible to achieve a particularly simple mounting of the adapter and a centering of this adapter that is not sensitive to soiling and has a very small amount of play, in particular no play and/or has a very small amount of eccentricity, in particular no eccentricity. In addition, it is possible to at least reduce an unwanted tilting angle of the adapter in the tool fitting.

In another embodiment of the invention, the centering surface embodied in the form of an inclined surface is situated at an end surface of a component. It is thus possible to manufacture the centering surface with little expenditure of effort. The inclined surface in this case can be oriented radially outward or can be advantageously oriented radially inward.

According to another embodiment, the means is comprised of a locking means that is provided to give the adapter an axial mobility that is at least less than the length of an idle span. The term "idle span" is understood in this context to mean a span of the rotary hammer bit and/or chisel bit that is at least essentially determined by the design of the tool fitting and must be bridged over in order to slide the rotary hammer bit and/or chisel bit from its idle position—in which it is not percussively driven and there is no work piece contact—into the tool fitting in the axial direction until it reaches an operating position in which the rotary hammer bit and/or chisel bit can be percussively driven. The axial mobility of the adapter, which is at least reduced as regards the idle span, makes it possible to work with the adapter in a particularly comfortable, precise way and in particular, permits an advantageous pilot drilling.

The means can be embodied in the form of a separate component especially provided only for reducing the mobility or can advantageously be at least partially integrated into a component having at least one other function, thus making it possible to reduce the number of additional components, required space, weight, assembly complexity, and costs.

The means and in particular, the means comprised of a centering means, is at least partially integrated into a main tool fitting body, permitting this means to be advantageously positioned with a low level of structural complexity and to be embodied advantageously with regard to its material strength. The term "main tool fitting body" is understood in this context to particularly mean a body that directly constitutes bearing surfaces for the rotary hammer bit and/or chisel bit and at least primarily serves to absorb the bearing forces of the rotary hammer bit and/or chisel bit. If the main tool fitting body is also comprised of a hammer tube into which a hammer mechanism is at least partially integrated, for example by having a hammer pin, a riveting die, and/or a piston of a hammer mechanism guided in it, then this makes it possible to further reduce the number of additional components. The main tool fitting body can, however, also be comprised of a component attached to a hammer tube. Alternatively or in addition to the main tool fitting body, however, it is also conceivable for other components to be provided, for example an end cap, etc. It is particularly advantageous for the end cap to be at least partially integrated into the means comprised of a locking means, which is provided to give the adapter an axial mobility that is at least less than the length of an idle span. The end cap is frequently manufactured out of an elastic plastic so that its elasticity can be advantageously used to generate a clamping force in the axial direction. A clamping force in the axial direction makes it possible to achieve a particularly advantageous, especially play-free fastening, while a centering surface, in particular a conical centering surface, makes it possible to achieve a particularly low degree of eccentricity. Alternatively to the use of an end cap, the clamping force can also be achieved by other means deemed appropriate by those skilled in the art, for example by means of especially provided spring elements, lever mechanisms, magnets, etc.

According to another embodiment, the adapter has at least one means that is provided to reduce the mobility of the adapter in relation to a rotary hammer bit and/or chisel bit associated with the tool fitting. This special means also makes it possible to work with the adapter in a particularly comfortable, precise way.

Preferably, the means is comprised of a centering means that is provided for centering the adapter in relation to the tool fitting and that has at least one centering surface provided to correspond with a centering surface separate from a bearing surface for a rotary hammer bit and/or chisel bit, as a result of which the adapter is advantageously able to achieve a small amount of radial play, a low degree of eccentricity, and in particular, a small tilting angle of the adapter in the tool fitting.

As in the tool fitting, the means comprised of a centering means can have various centering surfaces deemed appropriate by those skilled in the art, for example cylindrical and/or stepped centering surfaces, etc. But if the means has at least one centering surface embodied in the form of an inclined surface and in particular as a conical surface, then it is possible to achieve a particularly simple mounting of the adapter and a centering of this adapter that is not sensitive to soiling and has a very small amount of play, in particular no play and/or has a very small amount of eccentricity, in particular no eccentricity.

In another embodiment of the invention, the means of the adapter is comprised of a fastening means that is provided to reduce the axial mobility in relation to the rotary hammer bit and/or chisel bit. The special means of the adapter is particularly able to achieve a comfortable pilot drilling with the adapter.

The means of the tool fitting and adapter, which comprise a system, are preferably matched to each other so that the eccentricity is less than 1 mm and the axial mobility is less than 5 mm, advantageously less than 3 mm, and particularly advantageously less than 1 mm.

Furthermore, when mounted, the adapter advantageously as a smaller amount of radial play in relation to the tool fitting than an associated rotary hammer bit and/or chisel bit, preferably a radial play of less than 0.06 mm, and particularly preferably, a radial play of less than 0.04 mm.

If the adapter, when mounted, extends over an entire receiving region of the tool fitting, then it is also possible to reduce the eccentricity and a tilting angle of the adapter inside the tool fitting. The term "receiving region" is understood in this context particularly to mean a cylindrical region whose inner diameter is matched to an outer diameter of an associated rotary hammer bit and/or chisel bit.

BRIEF DESCRIPTION OF THE DRAWINGS

Additional advantages ensue from the following description of the drawings. The drawings depict an exemplary embodiment of the present invention. The drawings, the specification, and the claims contain numerous defining characteristics in combination. Those skilled in the art will also suitably consider the defining characteristics individually and unite them into other meaningful combinations.

DETAILED DESCRIPTION OF THE EXEMPLARY EMBODIMENT

Figure 1:
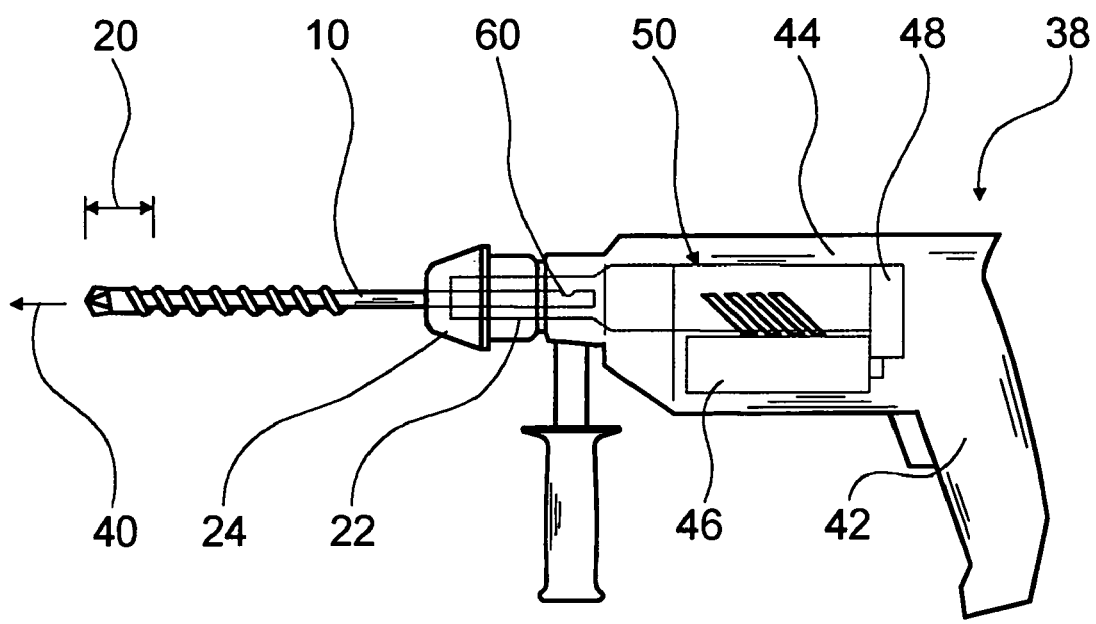
FIG. 1 is a side view of a rotary hammer/chisel hammer with a rotary hammer bit.

FIG. 1 is a side view of a hand-guided rotary hammer/chisel hammer 38. At a first end, the rotary hammer/chisel hammer 38 has a handle 42 extending at least essentially perpendicular to an operating direction 40 and at a second end, it has a tool fitting in which a rotary hammer bit 10 is detachably mounted. The rotary hammer bit 10 can be driven in rotary fashion by means of a schematically depicted electric motor 46 contained in a housing 44 and can be driven in a percussive fashion by means of a hammer mechanism 48 that can be driven by the electric motor 46. The hammer mechanism 48 has a piston guided in a hammer tube 50, which piston drives a hammer that is likewise guided in the hammer tube 50.

Figure 2:
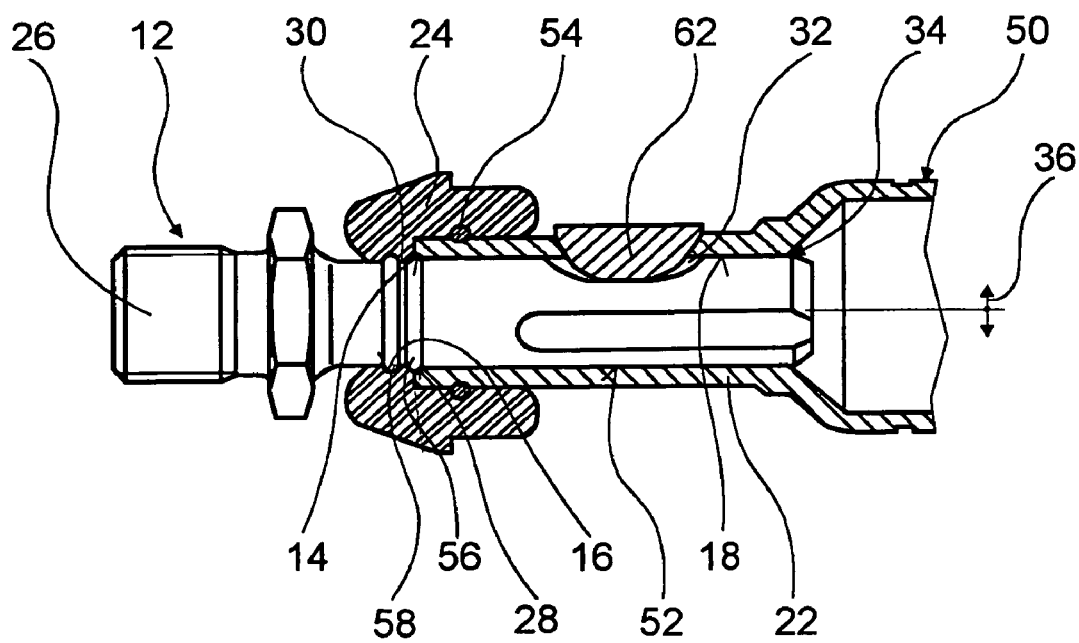
FIG. 2 is a longitudinal section through a tool fitting of the rotary hammer/chisel hammer from FIG. 1, with an adapter.
Figure 3:
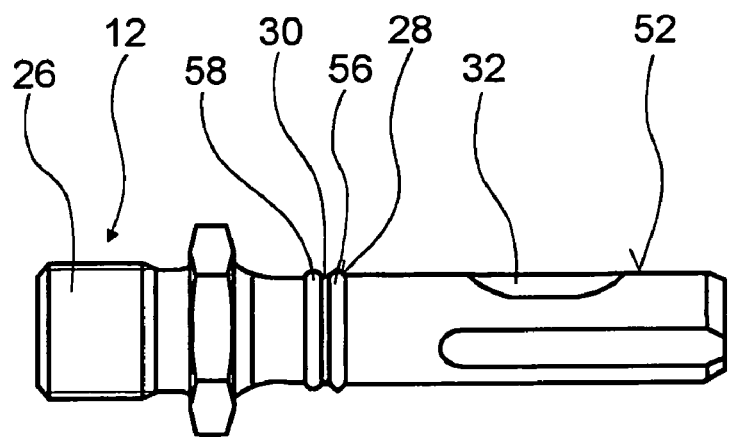
FIG. 3 is a detailed depiction of the adapter from FIG. 2.

The tool fitting is provided to accommodate various rotary hammer bits 10 and to accommodate an adapter 12 (FIGS. 2 and 3). The adapter 12 has a receiving region 26 embodied in the form of an external thread for a chuck, which is not shown in detail and in which a drill bit can be clamped.

At its end oriented away from the handle, the cylindrical hammer tube 50 has a tapered region that constitutes a main tool fitting body 22 with a receiving region 34 of the tool fitting. The tool fitting has a means 14 comprised of a centering means, which is provided for centering the adapter 12 and has a centering surface embodied in the form of an inclined surface separate from a bearing surface 18 for supporting the hammer drill bit 10. The inclined surface is comprised of a conical surface, is situated at an end surface of the main tool fitting body 22, and is oriented radially inward. When mounted, the centering surface of the means 14 corresponds to a conical centering surface—which is embodied in the form of an inclined surface—of a means 28 of the adapter 12. The means 28 is integrally formed onto the adapter 12 and is comprised of a protrusion 56, which extends in the radial direction over a cylindrical subregion of the adapter 12, constitutes a bearing surface 52 that corresponds to the bearing surface 18, and extends over the entire circumference of the adapter 12. It would also be possible, however, for the centering surface of the means 28 to extend over only segments of the circumference of the adapter 12. The centering surface of the means 28 of the adapter 12 and the centering surface of the means 14 of the tool fitting are pressed against each other when drilling with the adapter 12, which causes a centering to occur.

In addition to the means 14 for centering the adapter 12, the tool fitting also has a means 16 comprised of a locking means that is provided to give the adapter 12 an axial mobility that is less than an idle span 20 of the rotary hammer bit 10 (FIGS. 1 and 2). The idle span 20, which is approx. 6 mm, is the distance that the rotary hammer bit 10 must be slid into the tool fitting from an idle position—in which it is not driven in percussive fashion, i.e. in the unloaded state—in order to reach an operating position in which the rotary hammer bit 10 can be driven in percussive fashion.

The means 16 is integrated into an end cap 24 manufactured of plastic and is comprised of an annular groove-shaped recess extending over the entire inner circumference of the end cap 24. The end cap 24 is fastened to the hammer tube 50 by means of a snap ring 54, is connected to the hammer tube 50 by means of frictional engagement, and essentially rotates along with the hammer tube 50 during operation. The frictional engagement between the end cap 24 and the hammer tube 50 is, however, designed so that it can be overcome if the end cap 24 comes into contact with an object during operation.

When mounted, the means 16 of the tool fitting corresponds with a means 58 of the adapter 12 comprised of a fastening means, which is likewise provided to reduce the axial mobility in relation to the rotary hammer bit 10. The means 58, which extends radially outward and is comprised of a bead-shaped projection, engages with the means 16. The means 14, 16, 28, 58 are matched to one another so that the adapter 12 has an axial play of less than 1 mm in the tool fitting. It would also be essentially conceivable, however, for the means 14, 16, 28, 58 to be matched to one another so that when mounted, the adapter 12 is pressed so that the centering surface of the means 28 presses against the centering surface of the means 14 of the tool fitting with a clamping force. An annular groove-shaped recess 30 is provided between the protrusion 56 and the means 58.

The adapter 12 also has an additional means 32 comprised of a fastening means, which is provided to reduce the axial mobility of the adapter 12 in relation to the rotary hammer bit 10. The means 32 is comprised of a locking recess that is embodied as shorter than a locking recess 60 of the rotary hammer bit 10 so that the axial mobility of the adapter 12 inside the tool fitting—contingent on the locking recess—is shorter than the idle span 20. The locking recess constituting the means 32 in the current exemplary embodiment is embodied so that in its locked position, a locking body 62 that reaches through an opening in the main tool fitting body 22 can reach into the locking recess in the axial direction with approx. 1 mm of air space so that the adapter 12—depending solely on the locking recess and the locking body 62—has a maximum axial mobility of 1 mm.

In the current exemplary embodiment, the specially embodied locking recess of the adapter 12 thus constitutes a function redundant to that of the means 16 and 58. The special embodiment of the locking recess of the adapter 12 can achieve an advantageously reduced axial mobility of the adapter 12, even with alternative tool fittings not provided with a means 58. Depending on the matching of the locking recess to the locking body 62, the axial mobility of an adapter in a tool fitting can essentially also be embodied to be greater than 1 mm and can also be advantageously embodied to be less than 1 mm.

When mounted, the adapter 12, which extends over the entire receiving region 34 of the tool fitting, has a smaller amount of radial play 36 in relation to the tool fitting or inside the tool fitting than the associated rotary hammer bit 10, in fact, a radial play 36 less than or equal to 0.036 mm.

The length of the adapter 12 is embodied so that the hammer mechanism 48 can percussively drive it via a hammer and a riveting die and/or a hammer pin. It would also be essentially conceivable for the adapter 12 to be embodied as shorter in the direction toward the hammer mechanism so as to reliably prevent the adapter 12 from being percussively driven.

REFERENCE NUMERALS

| 10 | rotary hammer bit and/or chisel bit |
|---|---|
| 12 | adapter |
| 14 | means |
| 16 | means |
| 18 | bearing surface |
| 20 | idle span |
| 22 | component |
| 24 | component |
| 26 | receiving region |
| 28 | means |
| 30 | recess |
| 32 | means |
| 34 | receiving region |
| 36 | radial play |
| 38 | rotary hammer/chisel hammer |
| 40 | operating direction |
| 42 | handle |
| 44 | housing |
| 46 | electric motor |
| 48 | hammer mechanism |
| 50 | hammer tube |
| 52 | bearing surface |
| 54 | snap ring |
| 56 | protrusion |
| 58 | means |
| 60 | locking recess |
| 62 | locking body |

What is claimed is:

1. A system, comprising:
   a tool holder for holding at least a tool in the group consisting of a rotary hammer bit and a chisel bit;
   an adapter that is distinct from the tool and that is insertable into the tool holder,
   wherein the tool holder comprises:
   a tool fitting body with a receiving region for receiving said tool, the receiving region forming a bearing surface for supporting the tool such that the tool may be inserted into the tool fitting body in an insert direction parallel to the bearing surface;
   centering means configured to center the adapter, said centering means having at least one centering surface that is separate from the bearing surface; and
   wherein the adapter comprises:
   an inserting region that is provided to be inserted into the tool holder, wherein the inserting region abuts on said bearing surface of the tool holder when the adapter is mounted in the tool holder;
   a receiving region for receiving a chuck for a drill bit; and
   centering means configured for centering the adapter with respect to the tool holder, the centering means having at least a centering surface being provided to correspond with said centering surface of the tool holder.

2. The system as recited in claim 1, wherein the tool fitting body forms an end surface forming an opening for introducing said tool or the adapter into the receiving region of the tool fitting body and wherein said centering surface of the tool holder is situated at the end surface.

3. The system as recited in claim 1, wherein said centering surface of the tool holder is inclined with respect to the bearing surface.

4. The system as recited in claim 3, wherein said centering surface of the tool holder is oriented radially inward.

5. The system as recited in claim 3 wherein said centering surface has a conical shape.

6. The system as recited in claim 1, wherein the tool fitting body comprises a region of a hammer tube of a rotary hammer or a chisel hammer.

7. The system as recited in claim 1, wherein said centering surface of the adapter is inclined with respect to the bearing surface when mounted.

8. The system as recited in claim 7, wherein said centering surface of the adapter is conical.

9. The system as recited in claim 1, wherein the inserting region of the adapter is a cylindrical region forming a bearing surface that abuts on said bearing surface of the tool holder when mounted, and wherein said centering means of the adapter is formed by a protrusion which extends in a radial direction over the cylindrical region.

10. The system as recited in claim 1, wherein in the mounted state of the adapter in the tool holder, said centering surface of the adapter and said centering surface of the tool holder are pressed against each other causing centering to occur.

11. The system as recited in claim 1, further comprising a hammer mechanism for driving the rotary hammer bit in a percussive fashion, wherein the rotary hammer bit mounted in the tool fitting body must be slid into the tool fitting body over an idle span distance from an idle position in which it is not driven in percussive fashion to an operating position in which the rotary hammer bit is drivable in percussive fashion, and further comprising a locking means provided to give to the adapter in the mounted state in the tool fitting body an axial mobility in said insert direction that is less than the idle span distance.

12. The system as recited in claim 11, wherein the locking means comprises a means that is integrated into an end cap fastened to the tool fitting body.

13. The system as recited in claim 12, wherein said means corresponds to an annular groove-shaped recess of the end cap.

14. The system as recited in claim 12, wherein the locking means comprises a fastening means of the adapter, the fastening means engaging with said means of the end cap.

15. The system as recited in claim 14, wherein the fastening means corresponds to a projection extending radially outward.

16. A system, comprising:
   a tool holder for holding at least a too being a rotary hammer bit;
   an adapter that is distinct from the tool and that may be inserted into the tool holder,
   wherein the tool holder comprises:
   a tool fitting body with a receiving region for receiving said tool the receiving region forming a bearing surface for supporting the tool such that the tool may be inserted into the tool fitting body in an insert direction parallel to the bearing surface; and
   centering means configured to center the adapter, said centering means having at least one centering surface that is separate from the bearing surface;
   the system further comprising,
   a hammer mechanism for driving the rotary hammer bit in a percussive fashion, wherein the rotary hammer bit mounted in the tool fitting body must be slid into the tool fitting body over an idle span distance from an idle position in which it is not driven in percussive fashion to an operating position in which the rotary hammer bit is drivable in percussive fashion;
   wherein the adapter comprises:
   an inserting region that is provided to be inserted into the tool holder, wherein the inserting region abuts on said bearing surface of the tool holder when the adapter is mounted in the tool holder;
   a receiving region for receiving a chuck for a drill bit;
   centering means configured for centering the adapter with respect to the tool holder, the centering means having at least a centering surface being provided to correspond with said centering surface of the tool holder; and
   a locking means embodied as a locking recess provided to give to the adapter in the mounted state in the tool fitting body an axial mobility in said insert direction that is less than the idle span distance.

17. A system as recited in claim 16, wherein the adapter in the mounted state in the tool fitting body has an axial mobility of at most 1 mm in said insert direction.

18. A system as recited in claim 16, wherein the axial mobility of the adapter is reduced relative to the axial mobility of the rotary hammer bit.

* * * * *